(12) United States Patent
Eshleman et al.

(10) Patent No.: US 9,940,375 B2
(45) Date of Patent: *Apr. 10, 2018

(54) SYSTEMS AND METHODS FOR INTEREST-DRIVEN DISTRIBUTED DATA SERVER SYSTEMS

(71) Applicant: Workday, Inc., Pleasanton, CA (US)

(72) Inventors: John Glenn Eshleman, Mountain View, CA (US); Kevin Scott Beyer, San Francisco, CA (US); Brian Babcock, Palo Alto, CA (US); Carl-Christian Kanne, Campbell, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/223,106

(22) Filed: Jul. 29, 2016

(65) Prior Publication Data

US 2017/0193067 A1    Jul. 6, 2017

Related U.S. Application Data

(63) Continuation of application No. 13/790,624, filed on Mar. 8, 2013, now Pat. No. 9,405,811.

(51) Int. Cl.
*G06F 17/30* (2006.01)

(52) U.S. Cl.
CPC .. *G06F 17/30563* (2013.01); *G06F 17/30592* (2013.01)

(58) Field of Classification Search
CPC .................................................. G06F 17/30563
See application file for complete search history.

(56) References Cited

U.S. PATENT DOCUMENTS

| 7,945,852 | B1 * | 5/2011 | Pilskalns | G06F 17/30241 715/230 |
| 2009/0248631 | A1 * | 10/2009 | Alba | G06F 17/30522 |
| 2010/0100952 | A1 * | 4/2010 | Sample | H04L 12/5835 726/9 |
| 2011/0313969 | A1 * | 12/2011 | Ramu | G06F 17/30563 707/602 |
| 2012/0130987 | A1 * | 5/2012 | Bose | G06F 17/30489 707/718 |

(Continued)

*Primary Examiner* — Kris E Mackes
(74) *Attorney, Agent, or Firm* — Van Pelt, Yi & James LLP

(57) ABSTRACT

Systems and methods for interest-driven business intelligence systems in accordance with embodiments of the invention are illustrated. In one embodiment, an interest-driven distributed data server system includes a processor, an interest-driven distributed data server application, aggregate data storage, and a data source directory, wherein the interest-driven distributed data server application configures the processor to obtain reporting data requirements, determine at least one data dimension using the reporting data requirements, identify at least one data source identified that can provide data associated with the data dimension, generate data source job data, transmit the data source job data to at least one data source, and receive job response data, store the received job response data in the aggregate data storage, build reporting data based on the reporting data requirements, and transmit the reporting data.

17 Claims, 5 Drawing Sheets

(56) References Cited

U.S. PATENT DOCUMENTS

2013/0018671 A1\* 1/2013 Hussam ............... G06F 19/322
  705/3
2013/0086104 A1\* 4/2013 Morrison .......... G06F 17/30557
  707/769

\* cited by examiner

SYSTEMS AND METHODS FOR INTEREST-DRIVEN DISTRIBUTED DATA SERVER SYSTEMS

CROSS-REFERENCE TO RELATED APPLICATIONS

The current application is a continuation of U.S. patent application Ser. No. 13/790,624, filed Mar. 8, 2013 and issued as U.S. Pat. No. 9,405,811 on Aug. 2, 2016, the disclosure of which is hereby incorporated by reference in its entirety.

FIELD OF THE INVENTION

The present invention relates to business intelligence systems, specifically the distributed retrieval of data in business intelligence systems.

BACKGROUND OF THE INVENTION

Business intelligence refers to techniques for identifying, processing, and analyzing business data. Business intelligence systems can provide historical, current, and predictive views of business operations. Business data generated during the course of business operations, including data generated from business processes and the additional data created by employees and customers, can be structured, semi-structured, or unstructured depending on the context and knowledge surrounding the raw data. In many cases, raw data generated from business processes is structured, whereas raw data generated from customer interactions with the business is semi-structured or unstructured. Due to the amount of data generally generated during the course of business operations, business intelligence systems are commonly built on top of and utilize a data warehouse.

Data warehouses are utilized to store, analyze, and report data including, but not limited to, business data. Data warehouses utilize databases to store, analyze, and harness the data in a productive and cost-effective manner. A variety of databases are commonly utilized, such as a relational database management system (RDBMS), such as the Oracle Database from the Oracle Corporation of Santa Clara, Calif., or a massively parallel processing analytical database, such as Teradata from the Teradata Corporation of Miamisburg, Ohio. Business intelligence (BI) and analytical tools, such as SAS from SAS Institute, Inc. of Cary, N.C., are used to access the data stored in the database and provide an interface for developers to generate reports, manage and mine the stored data, perform statistical analysis, business planning, forecasting, and other business functions. Most reports created using BI tools are created by database administrators, and the underlying database can be tuned for expected access patterns. A database administrator can index, pre-aggregate, or restrict access to specific relations to allow ad-hoc reporting and exploration.

A snowflake schema is an arrangement of tables in a RDBMS, with a central fact table connected to one or more dimension tables. The dimension tables in a snowflake schema are normalized into multiple related tables—for a complex schema there will be many relationships between the dimension tables, resulting in a schema which looks like a snowflake. A star schema is a specific form of a snowflake schema having a fact table referencing one or more dimension tables. However, in a star schema, the dimensions are normalized into a single table—the fact table is the center and the dimension tables are the "points" of the star.

Online transaction processing (OLTP) systems are designed to facilitate and manage transaction-based applications. OTLP can refer to a variety of transactions such a database management system transactions, business, or commercial transactions. OLTP systems typically have low latency response to user requests. Online analytical processing (OLAP), a modification of OLTP, is an approach to answering multidimensional analytical queries. OLAP tools enable users to analyze multidimensional data utilizing three basic analytical operations: consolidation (aggregating data), drill-down (navigating details of data), and slice and dice (take specific sets of data and view from multiple viewpoints). The basis for any OLAP system is an OLAP cube. An OLAP cube is a data structure allowing for fast analysis of data with the capability of manipulating and analyzing data from multiple perspectives. OLAP cubes typically are composed of numeric facts, called measures, categorized by dimensions. These facts and measures are commonly created from a star schema or a snowflake schema of tables in a RDBMS.

SUMMARY OF THE INVENTION

Systems and methods for interest-driven business intelligence systems including interest-driven distributed data server systems in accordance with embodiments of the invention are illustrated. In one embodiment, an interest-driven distributed data server system includes a processor, a memory connected to the processor and configured to store an interest-driven distributed data server application, aggregate data storage configured to store aggregate data, where a portion of the aggregate data is generated using job response data, and directory storage configured to store a data source directory, wherein the data source directory includes at least one reference to a data source configured to store raw data and data source metadata describing the at least one data source and wherein the interest-driven distributed data server application configures the processor to obtain reporting data requirements, where the reporting data requirements include reporting data metadata, determine at least one data dimension using the reporting data requirements, for each data dimension: identify at least one data source identified using the data source metadata that can provide data associated with the data dimension, generate data source job data for at least one of the identified at least one data source based on the data source metadata, where the at least one data source can provide the data associated with the data dimension, transmit the data source job data to the at least one of the identified at least one data source, and receive job response data from the at least one of the identified at least one data source, store the received job response data in the aggregate data storage, build reporting data based on the reporting data requirements, and transmit the reporting data.

In another embodiment of the invention, the interest-driven distributed data server application configures the processor to identify existing data stored in the aggregate data storage that fulfills a portion of the reporting data requirements and build the reporting data based on the received job response data and the existing data stored in the aggregate data storage.

In an additional embodiment of the invention, the interest-driven distributed data server application configures the processor to identify additional data based on the at least one data dimension and the existing data stored in the aggregate data storage, where the additional data is associated with at least one additional data dimension in the at least one data dimension that is not associated with the existing data stored in the aggregate data storage and generate data source job data for the at least one data source associated with the additional data dimension based on the data source metadata, where the generated data source job data includes a request for the identified additional data.

In yet another additional embodiment of the invention, the aggregate data storage includes a plurality of data silos, where at least one piece of aggregate data in the aggregate data storage is associated with at least one data silo, the reporting data metadata includes data silo association data identifying at least one data silo, the data source metadata identifies at least one data silo, and the interest-driven distributed data server application configures the processor to identify at least one data source identified using the data source metadata that can provide data associated with the data dimension and at least one data silo in the data silo association data matches at least one data silo in the data source metadata associated with the identified data source and associate the at least one data silo in the data silo association data with the received job response data.

In still another additional embodiment of the invention, the interest-driven distributed data server application configures the processor to identify existing data stored in the aggregate data storage based on the reporting data metadata, where when aggregate data in the aggregate data storage is not associated with the at least one data silo in the data silo association data it is not identified as fulfilling a portion of the reporting data requirements.

In yet still another additional embodiment of the invention, the interest-driven distributed data server application configures the processor to obtain an additional data source, where the additional data source includes an additional data source identity, determine data source capabilities associated with the additional data source, generate additional data source metadata using the determined data source capabilities, and add the data source identity and the generated additional data source metadata to the data source directory.

In yet another embodiment of the invention, the reporting data metadata identifies at least one data source, the data source job data is transmitted to a second data source not included in the at least one data source, and the interest-driven distributed data server application configures the processor to update the at least one piece of reporting data metadata based on the second data source.

In still another embodiment of the invention, the interest-driven distributed data server application configures the processor to identify when at least one data source is unavailable, locate an alternative data source in the identified at least one data source that is available, generate data source job data for the alternative data source, and transmit the data source job data to the alternative data source.

In yet still another embodiment of the invention, the data source metadata includes data source performance data and the interest-driven distributed data server application configures the processor to generate data source job data for at least one of the identified at least one data source based on the data source metadata, where the at least one data source can provide the data and the data source job data is configured to optimize the performance of the at least one data source based on the data source performance data.

In yet another additional embodiment of the invention, wherein the interest-driven distributed data server application configures the processor to generate job response metadata based on the job response data and the data source providing the job response data, associate the job response metadata with the job response data, and automatically request updated job response data from the data source providing the job response data using the job response metadata.

In still another additional embodiment of the invention, the interest-driven distributed data server application configures the processor to generate data source job data for at least one of the identified at least one data source based on the data source metadata, where the at least one data source can provide the data and the data source job data is configured to request a portion of the data, receive job response data from the at least one data source, where the job response data contains a partial portion of the data, build partial reporting data using the received job response, generate updated data source job data for the at least one of the identified at least one data source based on the data source metadata and the received job response data, where the at least one of the identified at least one data source can provide the remaining portion of the data, transmit the updated data source job data to the at least one of the identified at least one data source, receive updated job response data from the at least one data source, where the updated job response data contains the remaining portion of the data, and build updated reporting data using the updated job response data, where the partial reporting data and the updated reporting data fulfill the reporting data requirements.

In yet still another additional embodiment of the invention, the interest-driven distributed data server application configures the processor to store the generated reporting data using the aggregate data storage.

In yet another embodiment of the invention, the data source job data is selected from the group consisting of structured query language (SQL) queries, NoSQL queries, MapReduce jobs, and distributed file system queries.

In still another embodiment of the invention, data source job data configures a data source to, perform extract, transform, and load processes to generate aggregate data using raw data stored in the data source, and create job response data using the aggregate data.

Still another embodiment of the invention includes a method for generating reporting data including obtaining reporting data requirements using an interest-driven distributed data server system, where the reporting data requirements include reporting data metadata, determining at least one data dimension based on the reporting data requirements using the interest-driven distributed data server system, for each data dimension: identifying at least one data source identified using the data source metadata that can provide data associated with the data dimension using the interest-driven distributed data server system, generating data source job data for at least one of the identified at least one data source based on the data source metadata using the interest-driven distributed data server system, where the at least one data source can provide the data associated with the data dimension, transmitting the data source job data to the at least one of the identified at least one data source using the interest-driven distributed data server system, and receiving job response data from the at least one of the identified at least one data source using the interest-driven distributed data server system, storing the received job response data using the interest-driven distributed data server system, building reporting data based on the reporting data requirements using the interest-driven distributed data server system, and transmitting the reporting data using the interest-driven distributed data server system.

In yet another additional embodiment of the invention, generating reporting data further includes identifying existing data stored in the aggregate data storage that fulfills a portion of the reporting data requirements using the interest-driven distributed data storage system, and building the reporting data based on the received job response data and the existing data stored in the aggregate data storage using the interest-driven distributed data storage system.

In still another additional embodiment of the invention, generating reporting data further includes obtaining an additional data source using the interest-driven distributed data storage system, where the additional data source includes an additional data source identity, determining data source capabilities associated with the additional data source using the interest-driven distributed data storage system, generating additional data source metadata based on the determined data source capabilities using the interest-driven distributed data storage system, and adding the data source identity and the generated additional data source metadata to a data source directory contained in the interest-driven distributed data server system using the interest-driven distributed data storage system.

In yet still another additional embodiment of the invention, generating reporting data further includes identifying when at least one data source is unavailable using the interest-driven distributed data storage system, locating an alternative data source in the identified at least one data source that is available using the interest-driven distributed data storage system, generating data source job data for the alternative data source using the interest-driven distributed data storage system, and transmitting the data source job data to the alternative data source using the interest-driven distributed data storage system.

In yet another embodiment of the invention, generating reporting data further includes generating job response metadata based on the job response data and the data source providing the job response data using the interest-driven distributed data storage system, associating the job response metadata with the job response data using the interest-driven distributed data storage system, and automatically requesting updated job response data from the data source providing the job response data based in the job response metadata using the interest-driven distributed data storage system.

In still another embodiment of the invention, a data source job data configures a data source to perform a process including performing extract, transform, and load processes to generate aggregate data based in raw data stored in the data source using the data source and creating job response data based on the aggregate data using the data source.

DETAILED DISCLOSURE OF THE INVENTION

Figure 1:
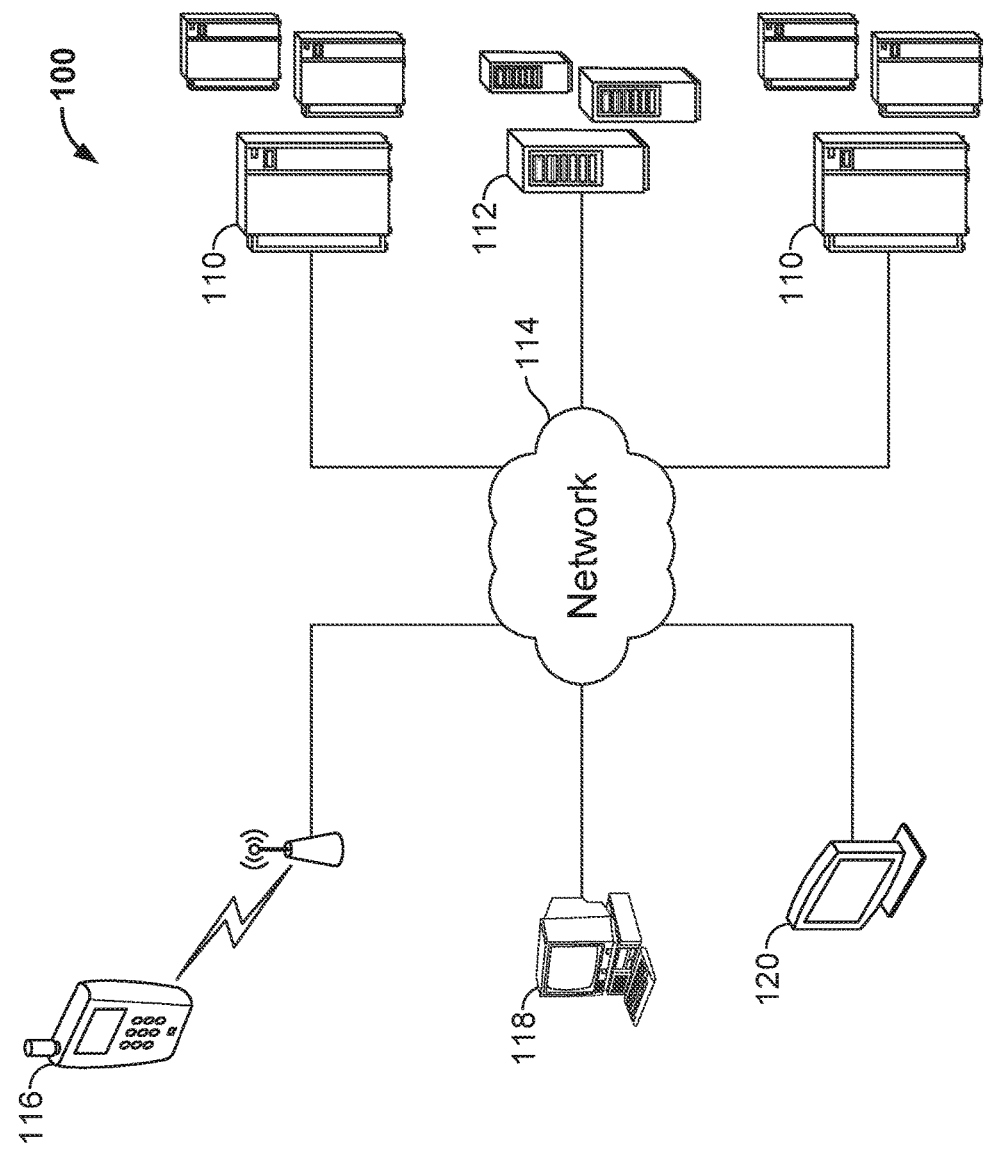
FIG. 1 is a network diagram of an interest-driven business intelligence system including an interest-driven distributed data server system in accordance with an embodiment of the invention.

Turning now to the drawings, interest-driven business intelligence systems including interest-driven distributed data server systems in accordance with embodiments of the invention are illustrated. Interest-driven business intelligence systems that can be utilized in accordance with embodiments of the invention are described in U.S. patent application Ser. No. 13/408,872 to Eshleman et al., titled "Interest-Driven Business Intelligence Systems and Methods of Data Analysis Using Interest-Driven Data Pipelines" and filed Feb. 29, 2012, the entirety of which is incorporated herein by reference. Interest-driven distributed data server systems enable analysts using a variety of client devices, including, but not limited to, interest-driven data visualization systems, to create reports using reporting data generated using the interest-driven distributed data server system from one or more data sources and, at the same time, to dynamically request new reporting data to update existing reports and/or create new reports. Systems and methods for interest-driven data visualizations systems which can be utilized in accordance with a number of embodiments are described in U.S. Provisional Patent Application No. 61/717,092 to Prabhu et al., titled "Systems and Methods for Interest-Driven Data Visualization Systems Utilized in Interest-Driven Business Intelligence Systems" and filed Oct. 22, 2012, the entirety of which is incorporated by reference. Interest-driven data visualization systems are configured to define and provide reporting data requirements specifying the reporting data that will be utilized to generate the reports. An interest-driven distributed data server system can utilize previously created reporting data and/or cause new and/or updated reporting data to be generated to satisfy the reporting data requirements using data retrieved from one or more data sources. A variety of data can be stored in and provided by a data source, including, but not limited to, raw data, aggregate data, filtered data, reporting data, and metadata describing the data available from the data source. The data stored in the data source can be structured, semi-structured, or unstructured. In a variety of embodiments, structured and semi-structured data include metadata, such as an index or other relationships, describing the data; unstructured data lacks any definitional structure. The interest-driven distributed data server system can fulfill reporting data requirements directly using the data provided by the data sources and/or the interest-driven distributed data server system can perform additional processing on the received data to generate the data fulfilling the reporting data requirements. In a variety of embodiments, the reporting data generation is performed using an interest-driven data pipeline. In several embodiments, the interest-driven distributed data server system is configured to maintain versions of data received from one or more data sources in a data mart. In many embodiments, a data mart is configured to store aggregate data and/or reporting data generated using an interest-driven data pipeline. In a number of embodiments, the interest-driven distributed data server system is configured to maintain versions of the data and using the interest-driven data pipeline and/or automatically refresh the data stored in the data mart based on updated data received from the data sources. The data stored in the data mart can be refreshed continuously, on a schedule, and/or on demand in accordance with the requirements of an embodiment of the invention. In a variety of embodiments, reporting data requirements are received from interest-driven data visualization systems based upon reporting requirements defined by analysts exploring metadata describing raw data stored in an interest-driven business intelligence system.

Interest-driven distributed data server systems are capable of managing multiple huge datasets in a way that provides an analyst with complete visibility into the available data utilizing metadata provided by the data sources and generated using the interest-driven distributed data server system describing the available data. Interest-driven distributed data server systems further have the ability to dynamically reconfigure the interest-driven distributed data server system (and/or interest-driven data pipelines) to provide access to desired information stored in the data sources using an interest-driven data pipeline. In order to achieve highly interactive performance, an interest-driven distributed data server system dynamically compiles an interest-driven data pipeline to create reporting data based on received reporting data requirements, data currently stored in a data mart contained in the interest-driven distributed data server system, and additional data stored in one or more of the data sources. Changes specified in the reporting data requirements can be automatically compiled and traced backward by the interest-driven distributed data server system to create an appropriate interest-driven data pipeline to meet the new reporting data requirements. Interest-driven distributed data server systems further build metadata concerning the data available in the available data sources and provide the metadata to enable the definition of reporting data and construction of reports using the metadata and/or the reporting data.

Using received reporting data requirements, interest-driven distributed data server systems are configured to identify data stored in the data mart that can be used to fulfill the reporting data requirements. When the data stored in the data mart is not sufficient to fulfill the reporting data requirements, the interest-driven distributed data server system is configured to identify one or more data sources that can provide the additional data and generate data source jobs to retrieve the additional data. The interest-driven distributed data server system maintains data source metadata describing the capabilities of each data source and is configured to generate a data source job that is targeted towards the specific capabilities of the target data source. In this way, the computing time and resources involved in satisfying a set of reporting data requirements can be reduced by reusing data present in the data mart along with offloading some or all of the data processing duties to the targeted data sources. In a variety of embodiments, the interest-driven distributed data server system is configured to retrieve a portion of data from one or more data sources and the data mart to provide partial reporting data to fulfill a portion of a reporting data requirement; the interest-driven distributed data server system then continues to retrieve data and generate additional reporting data as the data is retrieved from the data sources to fulfill the unfulfilled portion of the reporting data requirement. In several embodiments, the interest-driven distributed data server system is configured to identify multiple data sources that can provide a requested piece of data and, if a data source should fail or be otherwise unavailable (such as if the data source is slow or experiencing a heavy processing load), generate a data source job for a different data source capable of providing the requested piece of data.

Interest-driven distributed data server systems are configured to maintain a data mart configured to store the data retrieved by the interest-driven distributed data server system. The data mart can enable the interest-driven distributed data server system to present some or all of the data stored in the data mart to various interest-driven data visualization systems based on a variety of access factors. That is, the data mart can provide siloed (e.g. partitioned) views of the data stored in the data mart; based on the access factors, one or more data silos are available. In a variety of embodiments, a data silo is the portion of the data stored in the data mart and/or the data sources that are available to an interest-driven data visualization system along with one or more access control restrictions, although any partitioning of the data in the data mart and/or data sources to limit access to one or more of the partitions and/or data sources can be utilized as appropriate to specific applications in accordance with specific embodiments of the invention. In a number of embodiments, an interest-driven data visualization system is configured to access the data stored in the data mart and/or the data sources via a data silo. In many embodiments, the interest-driven distributed data server system is configured to retrieve data and perform updates on silos of data independently of each other. In several embodiments, the interest-driven distributed data server system is configured to maintain a unified set of data, enabling the interest-driven distributed data server system to utilize data present in a variety of data silos to fulfill received reporting data requirements even if the data is not visible in the data silo associated with the received reporting data requirements received from an interest-driven data visualization system. In a number of embodiments, the interest-driven distributed data server system associates metadata identifying the data source providing each piece of data stored in the data mart and the data silos are associated with one or more data sources whose data can be included in the data silo. Likewise, a data silo can be associated with one or more excluded data sources, where data from an excluded data source is not available via the data silo.

Interest-driven distributed data server systems are configured to store a data source directory containing a listing of all the known data sources for the interest-driven distributed data server system and the capabilities of each data source. In a number of embodiments, an interest-driven distributed data server system is configured to automatically locate and incorporate additional data sources. The interest-driven distributed data server system is configured to request data source capabilities from the located data source and/or probe the located data source to identify the capabilities of the data source. Data source capabilities include, but are not limited to, the techniques utilized to request data from the data source, the data stored in the data source, the location of the data source, the owner of the data source, the data silos associated with the data source, and any other information that is relevant as appropriate to specific applications in accordance with specific embodiments of the invention.

Systems and methods for interest-driven business intelligence systems including interest-driven distributed data server systems in accordance with embodiments of the invention are discussed further below.

Interest-Driven Business Intelligence Systems with Interest-Driven Distributed Data Server Systems Interest-driven distributed data server systems enable interest-driven business intelligence systems to locate and make available data from a plurality of data sources. Using the available data, users can create a variety of reports using interest-driven data visualization systems; the interest-driven distributed data server systems are configured to automatically retrieve the data necessary to populate the reports from the data sources. An interest-driven business intelligence system including an interest-driven distributed data server system in accordance with an embodiment of the invention is illustrated in FIG. 1. The interest-driven business intelligence system 100 includes a plurality of data sources 110 configured to store raw business data. The plurality of data sources 110 are configured to communicate with an interest-driven distributed data server system 112 via a network 114. In several embodiments, the network 114 is a local area network. In many embodiments, the plurality of data sources 110 communicates with the interest-driven distributed data server system 112 via the Internet 114. The plurality of data sources 110 can be configured to act as a raw data storage system and/or as a data warehouse within the interest-driven business intelligence system 100. In several embodiments, the interest-driven distributed data server system 112 is implemented using one server system or a cluster of computing devices. In a variety of embodiments, alternative distributed processing systems are utilized. Data sources 110 include, but are not limited to, relational databases, object-oriented databases, NoSQL databases, interest-driven business intelligence systems, distributed computing platforms, batch processing systems, data warehouses, and any other system configured to store data and provide access to that data as appropriate to specific applications in accordance with specific embodiments of the invention.

The interest-driven distributed data server system 112 is configured to communicate with one or more client devices, including, but not limited to, mobile devices 116, personal computers 118, and presentation devices 120. The client devices are configured to define reports containing a variety of reporting data (and visualizations for the reporting data) and provide reporting data requirements to the interest-driven distributed data server system 112 to request the reporting data. The interest-driven distributed data server system 112 is configured to receive the reporting data requirements and locate reporting data to fulfill the reporting data requirements using an interest-driven data pipeline. The interest-driven distributed data server system 112 can locate data that can be processed to create the necessary reporting data using data stored in the data mart associated with the interest-driven distributed data server system 112 and/or retrieve additional data from the plurality of data sources 110. The interest-driven distributed data server system 112 maintains a directory of the data available from each data source 110. The data source directory and/or the reporting data requirements identify from which data source(s) 110 to retrieve the data. In many embodiments, the interest-driven distributed data server system 112 is configured to identify if a data source is overloaded, unavailable, or has failed, and identify an alternative data source 110 from which the data can be retrieved.

To retrieve the data from the data sources 110, the interest-driven distributed data server system 112 creates one or more data source jobs and transmits the data source jobs to the relevant data sources 110. In a number of embodiments, the data source jobs are created using the interest-driven data pipeline. In many embodiments, the data source jobs configure the relevant data source 110 to retrieve data stored in the data source and perform extract, transform, and load (ETL) processes to create job response data. The interest-driven distributed data server system 112 receives the job response data from the data sources 110 and creates reporting data based on the received job response data and/or data stored in the data mart using an interest-driven data pipeline. The interest-driven distributed data server system 112 is configured to store the received job response data and/or the generated reporting data in the data mart. In a variety of embodiments, the interest-driven distributed data server system 112 recompiles the interest-driven data pipeline to provide access to the additional data that is stored in the data mart. In several embodiments, the generated reporting data only fulfills a portion of the reporting data requirements and the interest-driven distributed data server system 112 is configured to provide the generated reporting data and continue to request additional data from the data sources to generate additional reporting data to fulfill the unfilled portion of the reporting data requirements. In a number of embodiments, the data mart contains data silos and the data stored within the data mart and/or the data sources are associated with one or more data silos. The client devices are likewise associated with one or more data silos and can only request data available from the data silos associated with the client device.

The interest-driven distributed data server system 112 is configured to maintain a directory of data sources along with metadata describing the capabilities of each data source listed in the directory. In a variety of embodiments, the interest-driven distributed data server system 112 is configured to identify additional data sources in the plurality of data sources 110 that the interest-driven distributed data server system 112 does not have listed in its data source directory, determine the capabilities of the additional data sources, and add the data sources and related metadata describing the capabilities of the additional data sources to its data source directory. In this way, the interest-driven distributed data server system 112 is configured to locate additional data that can be utilized by the client devices to generate reports and by the interest-driven distributed data server system 112 to fulfill reporting data requirements.

Although a specific architecture for an interest-driven business intelligence system including an interest-driven distributed data server system in accordance with an embodiment of the invention is conceptually illustrated in FIG. 1, any of a variety of architectures configured to retrieve data from a plurality of data sources to generate reporting data in response to received reporting data requirements can also be utilized in accordance with embodiments of the invention. Systems and methods for interest-driven distributed data server systems in accordance with embodiments of the invention are discussed further below Interest-Driven Distributed Data Server Systems Interest-driven distributed data server systems in accordance with embodiments of the invention are configured to create data source jobs to request source data from interest-driven business intelligence systems based upon received reporting data requirements and to create reporting data using the received source data. In many embodiments, the interest-driven distributed data server systems are further configured to determine redundancies between previously received source data and generated reporting data and create jobs that efficiently request additional source data from interest-driven business intelligence systems to reduce requests for redundant data. An interest-driven distributed data server system in accordance with an embodiment of the invention is conceptually illustrated in FIG. 2. The interest-driven distributed data server system 200 includes a processor 210 in communication with volatile memory 220 and non-volatile memory 230. The interest-driven distributed data server system 200 also includes a network interface 240 configured to send and receive data over a network connection. In a number of embodiments, the network interface 240 is in communication with the processor 210, the non-volatile memory 230, and the volatile memory 220.

The non-volatile memory 230 contains an interest-driven distributed data server application 232, a data store directory 234, reporting data requirements 236, a data mart 238, and an interest-driven data pipeline 239. The interest-driven distributed data server application 232 configures the processor 210 to obtain reporting data requirements 236. In many embodiments, reporting data requirements 236 are obtained from an interest-driven data visualization system. In many embodiments, the interest-driven distributed data server application 232 further configures the processor 210 to determine one or more data dimensions using the reporting data requirements 236 to identify data that can be utilized to generate reporting data fulfilling the reporting data requirements 236. In a number of embodiments, the reporting data requirements 236 identify the data needed to fulfill the reporting data requirements 236. The interest-driven distributed data server application 232 configures the processor 210 to identify any relevant data stored in the data mart 238 and, if the relevant data is not sufficient to generate the reporting data, one or more data sources in the data source directory 234 can provide job response data to generate the remaining reporting data fulfilling the reporting data requirements 236.

The data store directory 234 includes a listing of data sources and data source metadata describing the characteristics of each data source along with metadata describing the data available from the data source. Techniques for determining data source characteristics in accordance with many embodiments of the invention are discussed below. In a variety of embodiments, data source data metadata includes, but is not limited to, the creation date of the data, the last modified date for the data, the owner of the data, the content of the data, the number of data items available, sample pieces of data, and interpretation data describing how the data in the data source should be interpreted. The processor 210 is configured by the interest-driven distributed data server application 232 to create data source jobs requesting data from the identified data sources and receive job response data from the identified data source fulfilling the data source job. In several embodiments, the processor 210 is configured by the interest-driven distributed data server application 232 to identify data sources that are experiencing a high processing load, have failed, or are otherwise unavailable, to locate one or more alternative data sources that can provide the job response data, and to generate data source jobs for the alternative data sources to retrieve the job response data. The interest-driven distributed data server application 232 further configures the processor 210 to process the received data and create reporting data fulfilling the reporting data requirements by combining, filtering, and/or aggregating the job response data and/or any relevant data stored in the data mart using an interest-driven data pipeline. In several embodiments, the interest-driven distributed data server application 232 configures the processor to create reporting data fulfilling a portion of the reporting data requirements 236; the processor 210 is further configured to continue requesting job response data and generating additional reporting data to fulfill the unfulfilled portions of the reporting data requirements 236. The received job response data and/or reporting data is stored in the data mart 238. In a variety of embodiments, the interest-driven distributed data server application 232 configures the processor 210 to request updates to the data stored in the data mart from the relevant data sources automatically or on a scheduled basis. In several embodiments, the interest-driven distributed data server application 232 configures the processor 210 to associate metadata with at least one piece of data stored in the data mart identifying the data source(s) providing the piece of data.

In a number of embodiments, the interest-driven distributed data server application 232 further configures the processor 210 to utilize an existing interest-driven data pipeline 239 and/or compile a new interest-driven data pipeline 239 to identify the data needed to respond to the reporting data requirements 236, locate any existing data in the data mart 238, identify additional data stored in the data sources along with the relevant data sources, generate data source jobs for the relevant data sources, transmit the data source jobs, receive job response data, generate the reporting data, store the relevant data in the data mart 238, and/or request updates to the data stored in the data mart 238. The interest-driven distributed data server application 232 can also configure the processor 210 to provide one or more data silos using the data mart 238, where the data silos control which data in the data mart 238 is accessible to an interest-driven data visualization system or other client device to generate reporting data requirements. The data silos can also limit what data stored in the data mart 238 and/or which data sources can be utilized to generate reporting data fulfilling the reporting data requirements 236 depending on the data silo(s) associated with the reporting data requirements 236. Similarly, an interest-driven data pipeline 239 can be associated with one or more data silos.

In many embodiments, the interest-driven distributed data server application 232, the data store directory 234, the reporting data requirements 236, the data mart 238, and/or the interest-driven data pipeline 239 are stored using an external server system and received by the interest-driven distributed data server system 200 using the network interface 240. External server systems in accordance with a variety of embodiments include, but are not limited to, interest-driven business intelligence systems, distributed computing platforms, interest-driven distributed data server systems, and interest-driven data visualization systems. In several embodiments, the processor 210 is configured to transmit a variety of data, including source jobs and reporting data using the network interface 240. In a variety of embodiments, the processor 210 is configured to receive a variety of data, including reporting data requirements and job response data, using the network interface 240. However, any data can be transferred and/or received by the processor 210 using the network interface 240 as appropriate to specific applications in accordance with specific embodiments of the invention.

Figure 2:
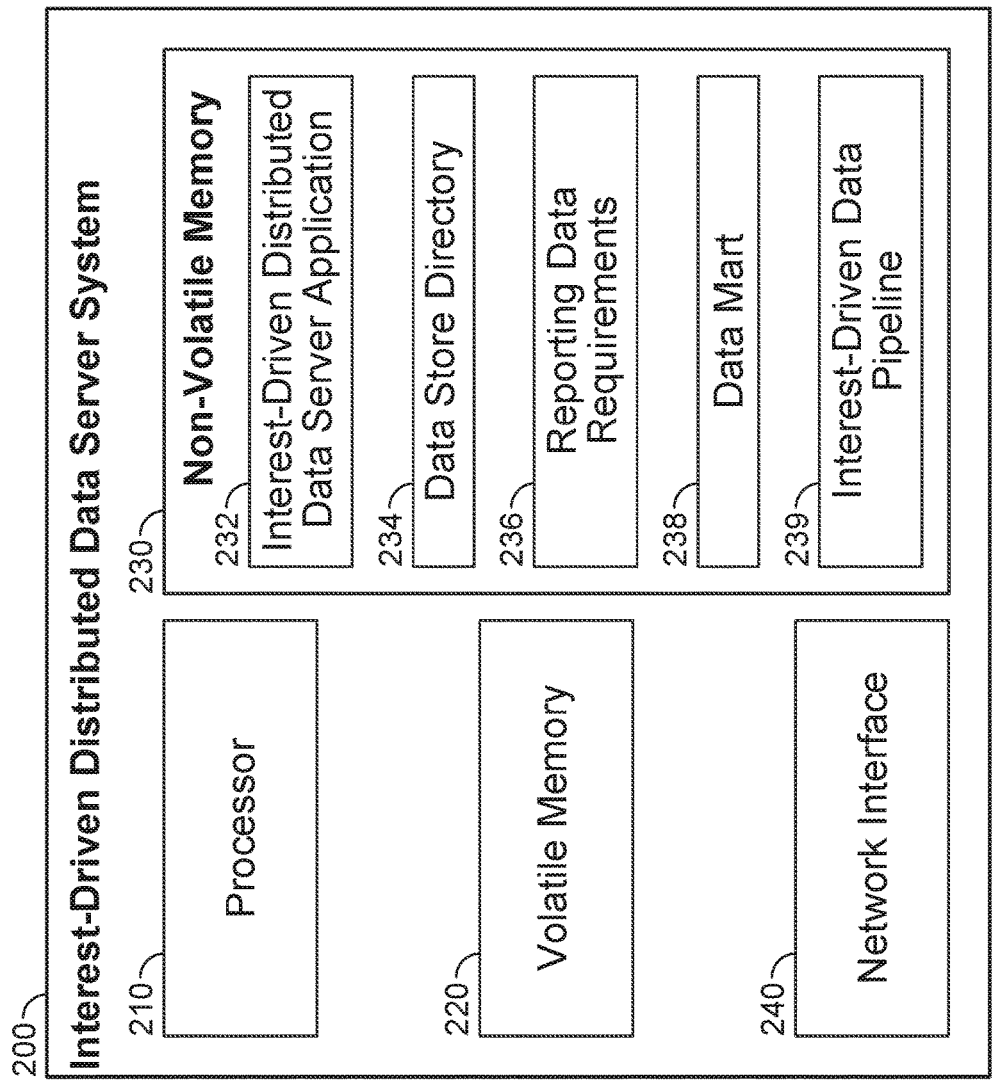
FIG. 2 is a conceptual illustration of an interest-driven distributed data server system in accordance with an embodiment of the invention.

Although a specific architecture for an interest-driven distributed data server system in accordance with an embodiment of the invention is conceptually illustrated in FIG. 2, any of a variety of architectures, including those that store data or applications on disk or some other form of storage and are loaded into volatile memory 220 at runtime, can also be utilized. Methods for the location, retrieval, and processing of data using interest-driven distributed data server systems in accordance with embodiments of the invention are discussed further below.

Interest-Driven Distributed Data Retrieval

Figure 3:
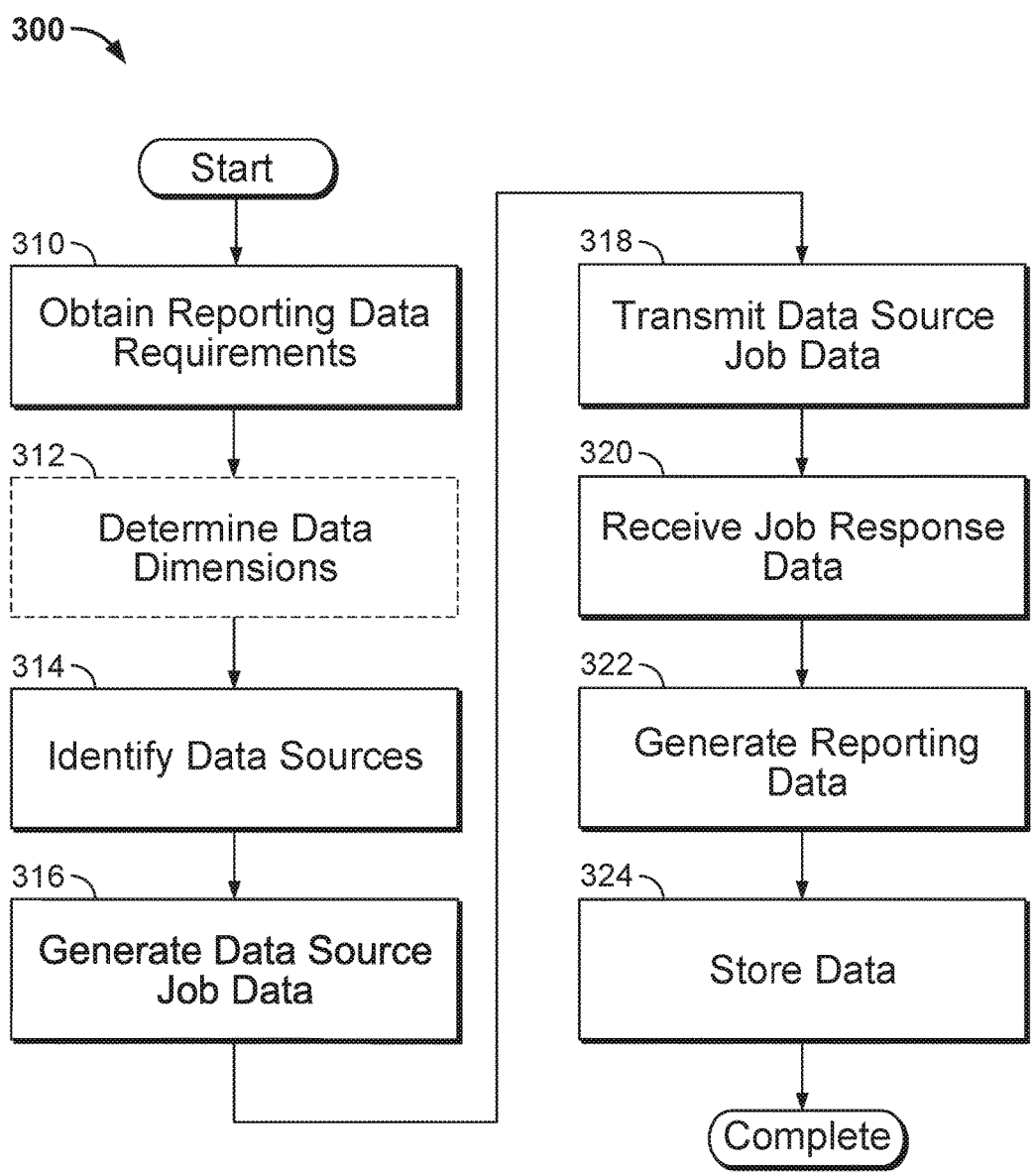
FIG. 3 is a flow chart illustrating a process for the interest-driven distributed retrieval of data in accordance with an embodiment of the invention.

Interest-driven business intelligence systems are often installed by businesses that already have an existing data storage infrastructure including one or more data sources storing business data and supporting existing business services. In many instances, the business wishes to continue using the existing data warehouses or is unable to fully replace the existing data storage infrastructure. By utilizing an interest-driven distributed data server system in accordance with an embodiment of the invention, an interest-driven business intelligence system can incorporate data from the existing data storage infrastructure and distribute the processing requirements across the currently existing data sources. In this way, the business can take full advantage of the power and flexibility of the interest-driven business intelligence system without the overhead and cost of replacing the existing data storage infrastructure. A process for interest-driven distributed data retrieval in accordance with an embodiment of the invention is illustrated in FIG. 3. The process 300 includes obtaining (310) reporting data requirements. In many embodiments, data dimensions are determined (312). Data sources are identified (314). Data source job data is generated (316). Data source job data is transmitted (318). Job response data is received (320). Reporting data is generated (322). Data is stored (324).

In several embodiments, reporting data requirements are obtained (310) from an interest-driven data visualization system; any client device requesting data can be utilized in accordance with embodiments of the invention. In a variety of embodiments, determining (312) data dimensions includes identifying dimensions in an OLAP cube fulfilling the obtained (310) reporting data requirements. Data sources are identified (314) using the determined (312) data dimensions and/or the obtained (310) reporting data requirements along with a data source directory and a data mart in a number of embodiments. The data mart stores existing data that can be utilized to fulfill the reporting data requirements and/or the data dimensions. The data source is identified (314) by comparing the data needed to fulfill the reporting data requirements and/or data dimensions with the data source metadata in the data source directory describing the data stored in the identified (314) data source. In a variety of embodiments, the identified (314) data source provides data that is not available in the data mart in the interest-driven distributed data server system. That is, the identified (314) data source provides data that, in combination with the relevant data identified in the data mart, fulfills the obtained (310) reporting data requirements and/or the determined (312) data dimensions. In a number of embodiments, the data in the data mart and the obtained (310) reporting data requirements are associated with a data silo and the existing data in the data mart is only relevant if the existing data is associated with data silo(s) associated with the reporting data requirements. In many embodiments, the data source is identified (314) using the obtained (310) reporting data requirements. In a variety of embodiments, multiple data sources are identified (314). In several embodiments, identifying (314) a data source includes querying the data source to determine if the data source is experiencing a heavy processing load, has failed, or is otherwise unavailable to process data source jobs. In several embodiments, the one or more identified (314) data sources are associated with the obtained (310) reporting data requirements.

In a number of embodiments, at least one piece of data source job data is generated (316) based upon the capabilities of the identified (314) data sources, where the data source capabilities are included in the data source metadata. In several embodiments, the data source job data is generated (316) by identifying requested data using the reporting data dimensions and identify specific query techniques using the identified requested data and the capabilities of the identified (314) data source(s). In many embodiments, the generated (316) data source job data configures the data source receiving the data source job data to perform ETL processes; in a variety of embodiments, the ETL processes configure the data source to generate aggregate data using raw data present in the data source. In several embodiments, the generated (316) data source job data is configured to request job response data based on the expected size of the job response data and/or the expected processing load and/or time to execute the generated (316) data source job data. Data source job data can take a variety of forms in accordance with embodiments of the invention, including, but not limited to, structured query language (SQL) queries, NoSQL queries, MapReduce jobs, and distributed file system queries. In many embodiments, the generated (316) data source job data is designed to retrieve only the data necessary to fulfill the obtained (310) reporting data requirements and/or the determined (312) data dimensions; in other embodiments, additional data is requested in the generated (316) data source job data. Additional data can be requested for a variety of reasons including, but not limited to, anticipation of future data requests, computing efficiency, and/or anticipated data source unavailability.

The generated (316) data source job data is transmitted (318) to the appropriate identified (314) data source or data sources. In a variety of embodiments, the received (320) job response data fulfills the generated (316) data source job data and/or the obtained (310) reporting data requirements. In a variety of embodiments, the transmitted (318) data source job data and/or the received (320) job response data are encrypted and/or compressed. In many embodiments, the received (320) job response data only fulfills a portion of the generated (316) data source job data, the obtained (310) reporting data requirements, and/or the determined (312) data dimensions. If the full data is not received, additional job response data is received (320) over time in order to fulfill the unfulfilled portions of the generated (316) data source job data, the obtained (310) reporting data requirements, and/or the determined (312) data dimensions. In several embodiments, reporting data is generated (322) by an interest-driven data pipeline using the received (320) job response data and any relevant existing data stored in the data mart. In many embodiments, the generated (322) reporting data and/or the received (320) job response data are stored in the data mart. In a variety of embodiments, the received (320) job response data is stored in the data mart and the interest-driven data pipeline is configured to generate the reporting data using the data stored in the data mart. In a number of embodiments, the generated (322) reporting data only fulfills a portion of the obtained (310) reporting data requirements and additional reporting data is generated (322) utilizing processes similar to those described above. In several embodiments, the stored (324) data is associated with one or more data silos; these data silos can include data silos identified in the obtained (310) reporting data requirements, Although a specific process for interest-driven distributed data retrieval is described above with respect to FIG. 3, any of a variety of processes, including those that generate data source job data using an interest-driven data pipeline, can be utilized in accordance with embodiments of the invention. Processes for performing incremental data updates in interest-driven distributed data server systems in accordance with embodiments of the invention are discussed further below.

Incremental Data Updates in Interest-Driven Distributed Data Server Systems

Figure 4:
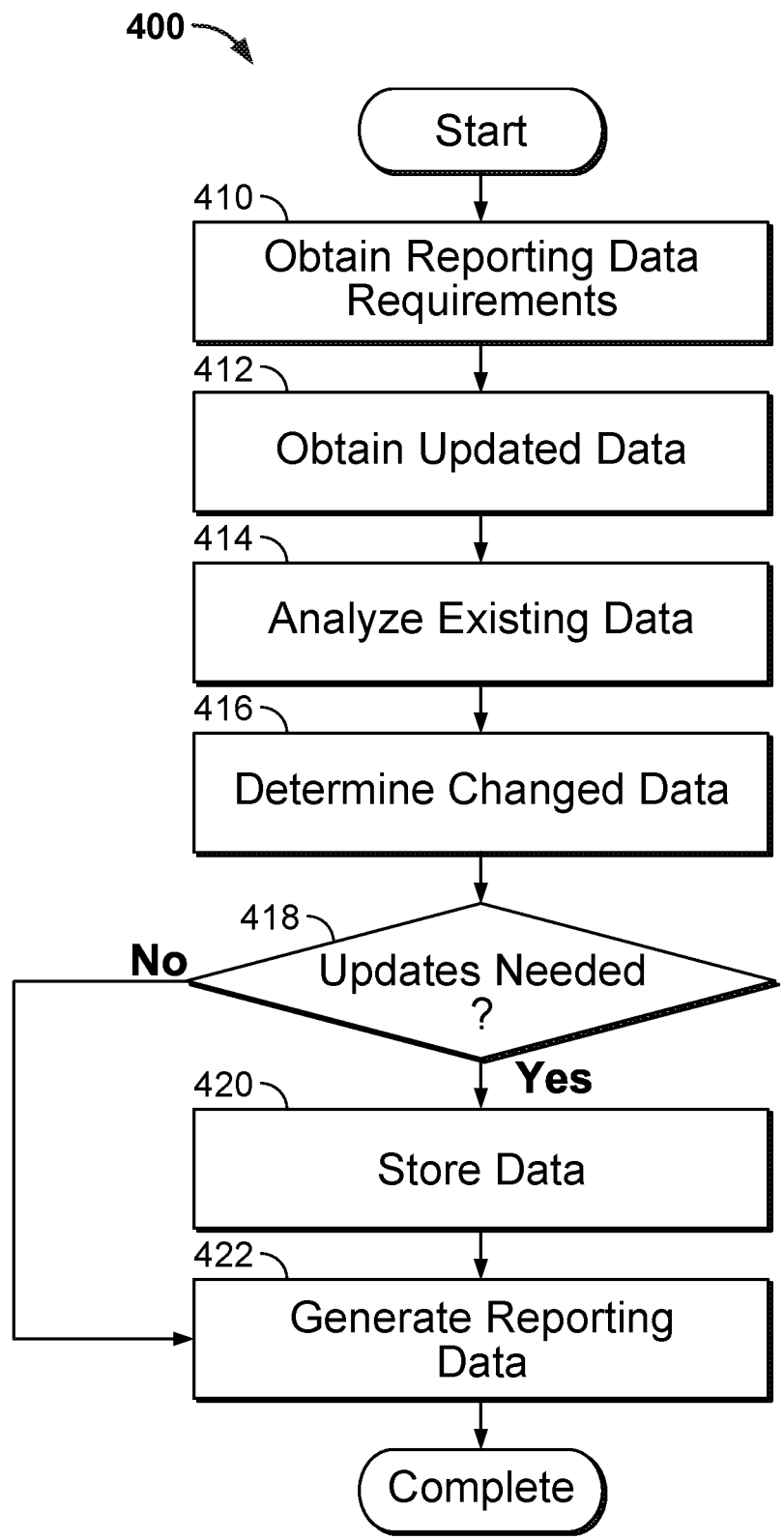
FIG. 4 is a flow chart illustrating a process for performing incremental updates of retrieved data in accordance with an embodiment of the invention.

Many reports are created based on existing reports and/or data that is common to multiple reports. It is likely that an interest-driven distributed data server system already contains some or all of the data needed to populate the new report in a data mart. Interest-driven distributed data server systems in accordance with embodiments of the invention are configured to identify data already stored in a data mart and to generate updated data to enable the interest-driven distributed data server system to generate the reporting data needed to populate the report without altering the data already present in the interest-driven distributed data server system. This enables interest-driven distributed data server systems to support updated reports without disturbing existing reports. A process for performing incremental data updates in interest-driven distributed data server systems in accordance with an embodiment of the invention is illustrated in FIG. 4. The process 400 includes obtaining (410) reporting data requirements. Updated data is obtained (412). Existing reporting data is analyzed (414). Changed data is determined (416). When updates are needed (418), updated data is stored (420). Reporting data is generated (422).

In a number of embodiments, reporting data requirements are obtained (410) from an interest-driven data visualization system; any client device requesting data can be utilized in accordance with embodiments of the invention. In many embodiments, updated data is obtained (412) from a data source using a process similar to the one described above with respect to FIG. 3; it should be noted that a variety of processes can be utilized to obtain (412) updated data in accordance with embodiments of the invention. In a variety of embodiments, the analyzed (414) existing data is stored in a data mart and the existing data was previously obtained (412) from the data source. Determining (416) changed data between the existing data and the obtained (412) data includes identifying areas of data that are similar in structure and/or content but contain some differences. A variety of factors can be utilized in the determination (416) of changed data, including, but not limited to, matching key/value pairs and comparing timestamps associated with the data. In several embodiments, determining (416) changed data includes identifying a portion of the data that is different; if the portion of the data that is different relative to the entirety of the data is over a threshold value, the data is determined (416) to have changed. The threshold value can be predetermined and/or determined dynamically based on the requirements of an embodiment of the invention. If changed data is determined (416) and updates are needed (418), the data is stored (420). In a number of embodiments, the changed data replaces the existing data. In several embodiments, the changed data is stored alongside the existing data. In a variety of embodiments, the existing data is incrementally updated using the changed data. In many embodiments, the obtained (412) data is modified using the existing data; including the possible replacement the determined (416) changed data. Reporting data is generated (422) using the stored data and/or the obtained (412) updated data using a variety of processes, including those described above with respect to FIG. 3.

Although a specific process for performing incremental data updates in interest-driven distributed data server systems is illustrated in FIG. 4, any of a variety of processes, including those that are performed automatically, on demand, and/or or on a schedule and those requesting data from a plurality of data sources, can be utilized in accordance with embodiments of the invention. Processes for incorporating data sources into an interest-driven distributed data server system in accordance with embodiments of the invention are discussed further below.

Figure 5:
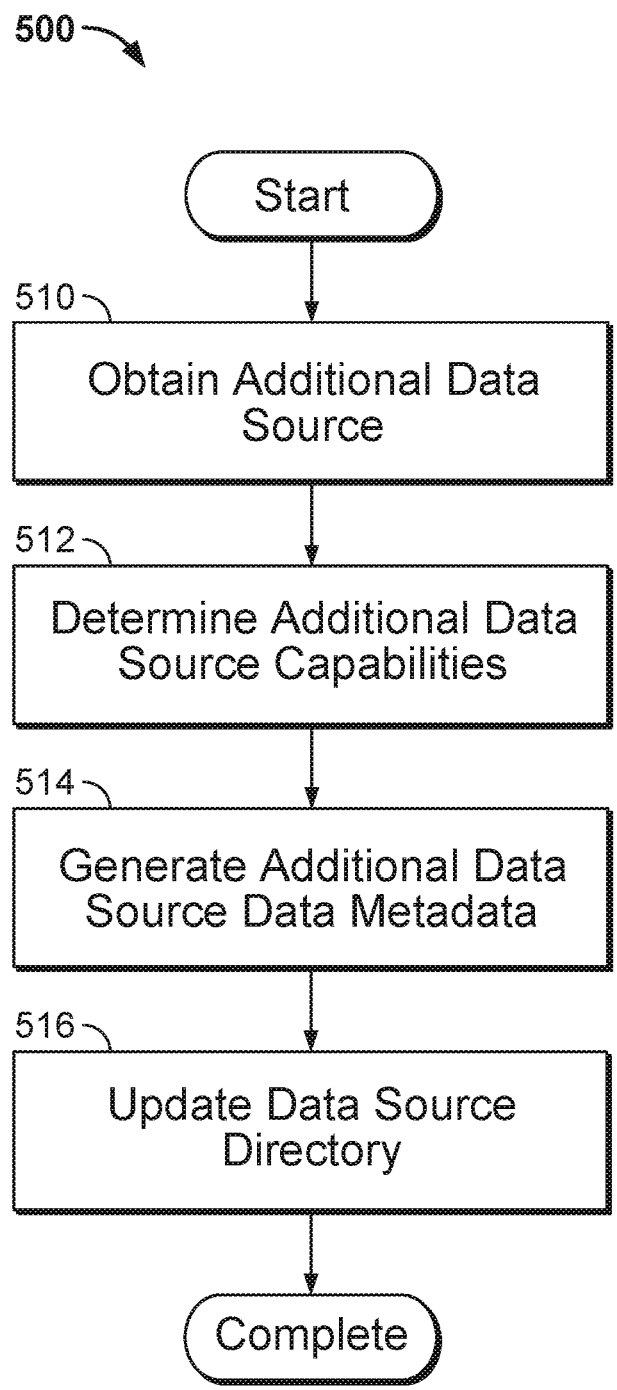
FIG. 5 is a flow chart illustrating a process for incorporating data sources into an interest-driven distributed data server system in accordance with an embodiment of the invention.

Incorporating Data Sources into an Interest-Driven Distributed Data Server System Interest-driven distributed data server systems are configured to request and receive data from a plurality of data sources. As businesses add new data sources, interest-driven distributed data server systems are configured to identify these new data sources and add them to its data source directory. In this way, interest-driven distributed data server systems dynamically expand, allowing the exploration of the new data sources and for reports to be created using the newly available data. A process for incorporating data sources into an interest-driven distributed data server system in accordance with an embodiment of the invention is illustrated in FIG. 5. The process 500 includes obtaining (510) an additional data source. Additional data source capabilities are determined (512). Additional data source metadata is generated (514). The data store directory is updated (516).

In a variety of embodiments, an additional data source is obtained (510) by receiving user input indicating that a new data source is available. In several embodiments, an additional data source is obtained (510) by automatically locating the additional data source, such as by scanning a network or querying a router or other network management device. In a variety of embodiments, obtaining (510) an additional data source includes determining a data source identity for the additional data source. A data source identity includes metadata uniquely identifying a data source, such as a media access control address, an internet protocol address, a unique identifier, credentials to access the data source, and/or a name associated with the data source; any other metadata identifying a data source can be utilized as appropriate to specific applications in accordance with specific embodiments of the invention. The capabilities of the data source can be determined (512) in a number of ways in accordance with embodiments of the invention, including, but not limited to, received user input specifying the data source capabilities, querying the obtained (510) additional data source, and identifying the obtained (510) additional data source and automatically retrieving information regarding the capabilities of the additional data source from a third-party information server system. In many embodiments, the determined (512) additional data source capabilities include metadata describing the data available via the additional data source, the processing power of the additional data source, the storage capacity of the additional data source, the location of the additional data source, a processing schedule associated with the additional data source, the version of the additional data source, and/or the data source job data, such as query languages, that the additional data source supports. Other data source capabilities can be determined (512) as appropriate to specific applications in accordance with specific embodiments of the invention. Additional data source metadata is generated (514) using the determined (512) additional data source capabilities. The data source directory is updated (516) using the data source identity along with the associated generated (514) additional data source metadata.

A specific process for incorporating data sources into an interest-driven distributed data server system is described above with respect to FIG. 5; however, any of a variety of processes, including those that identify changes to existing data sources and update the data source directory accordingly, can be utilized in accordance with embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An interest-driven distributed data server system, comprising:
a processor;
a memory connected to the processor and configured to store an interest-driven distributed data server application;
aggregate data storage configured to store aggregate data, where a portion of the aggregate data is generated using job response data; and
directory storage configured to store a data source directory;
wherein the data source directory comprises:
at least one reference to at least one data source configured to store raw data; and
data source metadata describing the at least one data source, wherein the data source metadata includes data source performance data; and
wherein the interest-driven distributed data server application configures the processor to:
obtain reporting data requirements, where the reporting data requirements comprise reporting data metadata, wherein the reporting data metadata identifies at least one data source;
determine at least one data dimension using the reporting data requirements;
for each data dimension:
identify at least one data source identified using the data source metadata that can provide data associated with the data dimension;
generate data source job data for at least one of the identified at least one data source based on the data source metadata, wherein the data source job data is transmitted to a second data source not included in the at least one data source, wherein the at least one data source can provide the data associated with the data dimension, and wherein the generating of the data source job data comprises to:
request job response data based on an expected size of the job response data, an expected processing load, a time to execute the generated data source job data, or any combination thereof;
transmit the data source job data to the at least one of the identified at least one data source; and
receive the job response data from the at least one of the identified at least one data source;
update at least one piece of reporting data metadata based on the second data source;
generate data source job data for at least one of the identified at least one data source based on the data source metadata, wherein the at least one data source provides the data and the data source job data is configured to optimize the performance of the at least one data source based on the data source performance data;
store the received job response data in the aggregate data storage;
build reporting data based on the reporting data requirements; and
transmit the reporting data.

2. The interest-driven distributed data server system of claim 1, wherein the interest-driven distributed data server application configures the processor to:
identify existing data stored in the aggregate data storage that fulfills a portion of the reporting data requirements; and
build the reporting data based on the received job response data and the existing data stored in the aggregate data storage.

3. The interest-driven distributed data server system of claim 2, wherein the interest-driven distributed data server application configures the processor to:
identify additional data based on the at least one data dimension and the existing data stored in the aggregate data storage, where the additional data is associated with at least one additional data dimension in the at least one data dimension that is not associated with the existing data stored in the aggregate data storage; and
generate data source job data for the at least one data source associated with the additional data dimension based on the data source metadata, where the generated data source job data includes a request for the identified additional data.

4. The interest-driven distributed data server system of claim 2, wherein:
the aggregate data storage comprises a plurality of data silos, where at least one piece of aggregate data in the aggregate data storage is associated with at least one data silo;
the reporting data metadata comprises data silo association data identifying at least one data silo;
the data source metadata identifies at least one data silo; and
the interest-driven distributed data server application configures the processor to:
identify at least one data source identified using the data source metadata that can provide data associated with the data dimension and at least one data silo in the data silo association data matches at least one data silo in the data source metadata associated with the identified data source; and
associate the at least one data silo in the data silo association data with the received job response data.

5. The interest-driven distributed data server system of claim 4, wherein the interest-driven distributed data server application configures the processor to identify existing data stored in the aggregate data storage based on the reporting data metadata, where when aggregate data in the aggregate data storage is not associated with the at least one data silo in the data silo association data it is not identified as fulfilling a portion of the reporting data requirements.

6. The interest-driven distributed data server system of claim 1, wherein the interest-driven distributed data server application configures the processor to:
obtain an additional data source, where the additional data source comprises an additional data source identity;
determine data source capabilities associated with the additional data source;
generate additional data source metadata using the determined data source capabilities; and
add the data source identity and the generated additional data source metadata to the data source directory.

7. The interest-driven distributed data server system of claim 1, wherein the interest-driven distributed data server application configures the processor to:
generate job response metadata based on the job response data and the data source providing the job response data;

associate the job response metadata with the job response data; and automatically request updated job response data from the data source providing the job response data using the job response metadata.

8. The interest-driven distributed data server system of claim 1, wherein the interest-driven distributed data server application configures the processor to:

generate data source job data for at least one of the identified at least one data source based on the data source metadata, where the at least one data source can provide the data and the data source job data is configured to request a portion of the data;

receive job response data from the at least one data source, where the job response data contains a partial portion of the data;

build partial reporting data using the received job response;

generate updated data source job data for the at least one of the identified at least one data source based on the data source metadata and the received job response data, where the at least one of the identified at least one data source can provide the remaining portion of the data;

transmit the updated data source job data to the at least one of the identified at least one data source;

receive updated job response data from the at least one data source, where the updated job response data contains the remaining portion of the data; and build updated reporting data using the updated job response data, where the partial reporting data and the updated reporting data fulfill the reporting data requirements.

9. The system of claim 1, wherein the interest-driven distributed data server application configures the processor to store the generated reporting data using the aggregate data storage.

10. The system of claim 1, wherein the data source job data is selected from the group consisting of structured query language (SQL) queries, NoSQL queries, MapReduce jobs, and distributed file system queries.

11. The system of claim 1, wherein data source job data configures a data source to:

perform extract, transform, and load processes to generate aggregate data using raw data stored in the data source; and create the job response data using the aggregate data.

12. A method for generating reporting data, comprising:

obtaining reporting data requirements using an interest-driven distributed data server system, where the reporting data requirements comprise reporting data source metadata, wherein the reporting data source metadata identifies at least one data source;

determining at least one data dimension based on the reporting data requirements using the interest-driven distributed data server system;

for each data dimension:

identifying at least one data source identified using the data source metadata that can provide data associated with the data dimension using the interest-driven distributed data server system, wherein the data source metadata includes data source performance data;

generating data source job data for at least one of the identified at least one data source based on the data source metadata using the interest-driven distributed data server system wherein the data source job data is transmitted to a second data source not included in the at least one data source, where the at least one data source can provide the data associated with the data dimension, and wherein the generating of the data source job data comprises:

requesting job response data based on an expected size of the job response data, an expected processing load, a time to execute the generated data source job data, or any combination thereof;

transmitting the data source job data to the at least one of the identified at least one data source using the interest-driven distributed data server system; and receiving the job response data from the at least one of the identified at least one data source using the interest-driven distributed data server system;

updating at least one piece of reporting data metadata based on the second data source;

generating data source job data for at least one of the identified at least one data source based on the data source metadata, wherein the at least one data source provides the data and the data source job data is configured to optimize the performance of the at least one data source based on the data source performance data;

storing the received job response data using the interest-driven distributed data server system;

building reporting data based on the reporting data requirements using the interest-driven distributed data server system; and transmitting the reporting data using the interest-driven distributed data server system.

13. The method of claim 12, further comprising:

identifying existing data stored in aggregate data storage that fulfills a portion of the reporting data requirements using interest-driven distributed data storage system; and building the reporting data based on the received job response data and the existing data stored in the aggregate data storage using the interest-driven distributed data storage system.

14. The method of claim 12, further comprising:

obtaining an additional data source using interest-driven distributed data storage system, where the additional data source comprises an additional data source identity;

determining data source capabilities associated with the additional data source using the interest-driven distributed data storage system;

generating additional data source metadata based on the determined data source capabilities using the interest-driven distributed data storage system; and adding the data source identity and the generated additional data source metadata to a data source directory contained in the interest-driven distributed data server system using the interest-driven distributed data storage system.

15. The method of claim 12, further comprising:

generating job response metadata based on the job response data and the data source providing the job response data using interest-driven distributed data storage system;

associating the job response metadata with the job response data using the interest-driven distributed data storage system; and automatically requesting updated job response data from the data source providing the job response data based in the job response metadata using the interest-driven distributed data storage system.

16. The method of claim 12, wherein data source job data configures a data source to perform a process comprising:
performing extract, transform, and load processes to generate aggregate data based in raw data stored in the data source using the data source; and
creating the job response data based on the aggregate data using the data source.

17. An interest-driven distributed data server system, comprising:
a processor;
a memory connected to the processor and configured to store an interest-driven distributed data server application;
aggregate data storage configured to store aggregate data, where a portion of the aggregate data is generated using job response data; and
directory storage configured to store a data source directory;
wherein the data source directory comprises:
at least one reference to at least one data source configured to store raw data; and
data source metadata describing the at least one data source, wherein the data source metadata includes data source performance data; and
wherein the interest-driven distributed data server application configures the processor to:
obtain reporting data requirements, where the reporting data requirements comprise reporting data metadata, wherein the reporting data metadata identifies at least one data source;
determine at least one data dimension using the reporting data requirements;
for each data dimension:
identify at least one data source identified using the data source metadata that can provide data associated with the data dimension;
generate data source job data for at least one of the identified at least one data source based on the data source metadata, wherein the data source job data is transmitted to a second data source not included in the at least one data source, wherein the at least one data source can provide the data associated with the data dimension, and wherein the generating of the data source job data comprises to:
request job response data based on an expected size of the job response data, an expected processing load, a time to execute the generated data source job data, or any combination thereof;
transmit the data source job data to the at least one of the identified at least one data source; and
receive the job response data from the at least one of the identified at least one data source;
update at least one piece of reporting data metadata based on the second data source;
generate data source job data for at least one of the identified at least one data source based on the data source metadata, wherein the at least one data source provides the data and the data source job data is configured to optimize the performance of the at least one data source based on the data source performance data;
store the received job response data in the aggregate data storage;
build reporting data based on the reporting data requirements;
transmit the reporting data;
identify when at least one data source is unavailable;
locate an alternative data source in the identified at least one data source that is available;
generate data source job data for the alternative data source; and
transmit the data source job data to the alternative data source.

* * * * *